US008831799B1

(12) United States Patent
Levine et al.

(10) Patent No.: US 8,831,799 B1
(45) Date of Patent: Sep. 9, 2014

(54) FLIGHT DIRECTOR FLARE GUIDANCE

(71) Applicant: The Boeing Company, Chicago, IL (US)

(72) Inventors: Benjamin David Levine, Seattle, WA (US); Steven Barry Krogh, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/856,454

(22) Filed: Apr. 4, 2013

(51) Int. Cl.
*G05D 1/00* (2006.01)
*G05D 1/06* (2006.01)
*G05D 1/08* (2006.01)
*G08G 5/02* (2006.01)
*G01C 23/00* (2006.01)

(52) U.S. Cl.
CPC ............... *G08G 5/02* (2013.01); *G05D 1/0676* (2013.01); *G05D 1/085* (2013.01); *G01C 23/005* (2013.01)
USPC ................ 701/18; 701/16; 340/976; 244/183

(58) Field of Classification Search
None
See application file for complete search history.

(56) References Cited

U.S. PATENT DOCUMENTS

| 3,031,662 A | 7/1962 | Bond |
| 3,333,795 A | 8/1967 | Hattendorf et al. |
| 3,489,378 A | 1/1970 | Watson et al. |
| 3,604,908 A | 9/1971 | Loome et al. |
| 3,887,148 A | 6/1975 | Devlin |
| 3,892,373 A | 7/1975 | Doniger |
| 3,994,455 A | 11/1976 | Simpson |
| 4,057,782 A * | 11/1977 | Muller ......................... 340/972 |
| 4,147,056 A * | 4/1979 | Muller ......................... 73/178 T |
| 4,354,237 A | 10/1982 | Lambregts et al. |
| 4,413,320 A * | 11/1983 | Brandau et al. ................. 701/16 |
| 4,419,079 A * | 12/1983 | Georges et al. ................. 434/43 |
| 5,020,747 A * | 6/1991 | Orgun et al. .................. 244/187 |
| 5,377,937 A * | 1/1995 | LaMay et al. ................. 244/185 |
| 5,695,156 A | 12/1997 | Firuz et al. |
| 6,676,088 B1 | 1/2004 | Greene |
| 8,175,763 B2 * | 5/2012 | Yamane et al. ................. 701/16 |
| 2013/0304285 A1* | 11/2013 | Dumoulin et al. .............. 701/16 |

* cited by examiner

*Primary Examiner* — Michael J Zanelli
(74) *Attorney, Agent, or Firm* — Hope Baldauff, LLC

(57) ABSTRACT

Methods, systems, and computer-readable media are described herein for providing flight director guidance throughout a flare maneuver during landing operations. A pre-flare flight path to a runway may be received, and a flare engage altitude calculated. A flare command path may be calculated having a slope associated with a desired descent rate at a desired touchdown location on a runway. An aircraft flare trajectory may be calculated that transitions the aircraft from the flare engage altitude on the pre-flare flight path to the flare command path at the desired touchdown location. A flight director command may be provided during the flare maneuver that aligns a current flight path with the aircraft flare trajectory.

20 Claims, 7 Drawing Sheets

FLIGHT DIRECTOR FLARE GUIDANCE

BACKGROUND

Fixed-wing aircraft pilots typically strive to land the aircraft at a very low sink rate. Doing so may reduce the wear on the aircraft, reduce maintenance costs, increase passenger comfort and satisfaction, and generally increase safety. In order to reduce the sink rate of the aircraft during landings, pilots normally perform a flare maneuver prior to touchdown. During the flare maneuver, the aircraft pitches upward, reducing the sink rate to an acceptable level just prior to the main landing gear touching down on the runway.

However, performing a flare maneuver improperly often results in landings that are farther down the runway than the desired touchdown zone. Landing too far down the runway may require increased braking and thrust reverser usage, increasing maintenance and repair costs. In addition, several overruns typically occur each year because the aircraft touches down without enough runway distance remaining to safely come to a stop. These overruns sometimes result in physical injuries, as well as damage to aircraft and to airport property.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, systems, and computer-readable media are described herein for providing guidance during a flare maneuver of an aircraft. According to embodiments presented herein, a pre-flare flight path to a runway may be determined and a flare engage altitude along the pre-flare flight path calculated. A flare command path may be calculated that includes a linear path intersecting the runway at a desired touchdown location. The flare command path may have a slope associated with a desired descent rate of the aircraft at the desired touchdown location. The flare command path calculation may include an intersection of an extrapolated aircraft flight path and the runway, the desired touchdown location, and the desired descent rate. A desired aircraft flare trajectory may be calculated that transitions the aircraft from a location on the pre-flare flight path at the flare engage altitude to the flare command path at the desired touchdown location. Current aircraft flight parameters may be received and a flight director command provided that aligns the current aircraft flight parameters with the desired aircraft flare trajectory.

The features, functions, and advantages discussed herein can be achieved independently in various embodiments of the present disclosure or may be combined in yet other embodiments, further details of which can be seen with reference to the following description and drawings.

BRIEF DESCRIPTION OF THE DRAWINGS

FIG. 4 is an aircraft touchdown diagram illustrating error limiting aspects of a flare guidance system, in accordance with embodiments presented herein;

DETAILED DESCRIPTION

Figure 1:
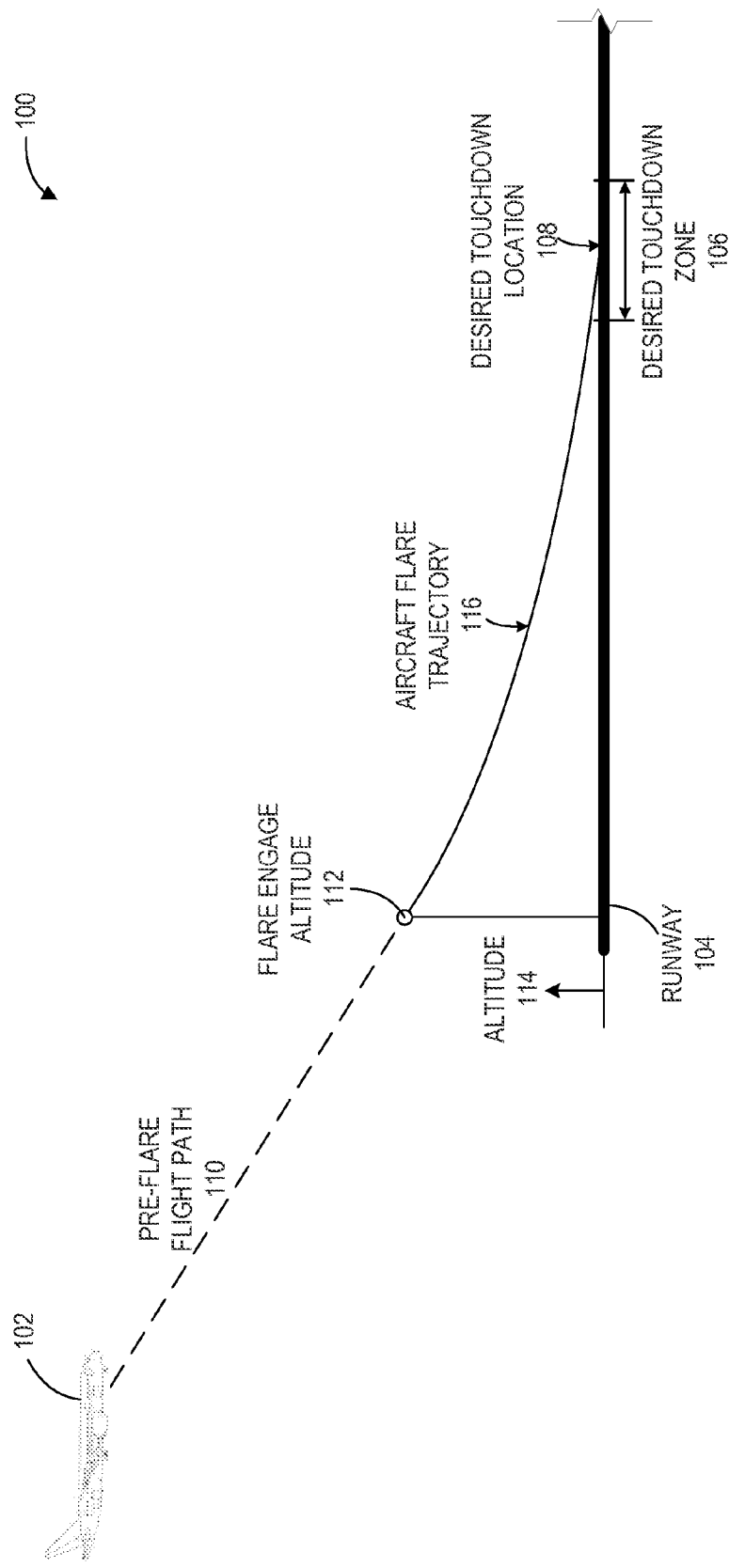
FIG. 1 is a landing diagram illustrating a flight path for an aircraft to a flare engage altitude, and from the flare engage altitude to a touchdown location on a runway, in accordance with embodiments presented herein.

The following detailed description is directed to methods, systems, computer-readable media, and other suitable technologies for providing flare guidance to a pilot for performing a flare maneuver during aircraft landings. Conventional flare guidance systems may not adequately provide pilots with a flare maneuver that is dependable and accurate according to the characteristics of the runway on which the associated aircraft is landing. These deficiencies in conventional flare guidance systems often result in loss of confidence from pilots and non-use of the systems, as well as long landings that provide additional wear on aircraft brake and reverse-thrust systems, and in extreme cases, may result in the aircraft overrunning the end of the runway.

According to the concepts and technologies described herein, a flare guidance system utilizes current flight parameters of the landing aircraft, coupled with characteristics of the runway upon which the aircraft is landing, to determine and provide flare maneuver guidance to a flight director or other guidance system for display to a pilot during landing operations. Most conventional commercial aircraft have various autopilot and other avionics systems that are capable of autonomously flying the aircraft along a pre-determined or pre-programmed flight course, or capable of providing guidance and feedback to the pilot during flight in order to assist the pilot in maintaining the desired course.

For example, a "flight director" as referred to throughout this discussion may include one or more icons or representations on an aircraft display generated by a flight computer and corresponding software. For the purposes of this discussion, the flight director may refer to the actual representations displayed for the pilot, or may more generally refer to the flight computer or software generating the representations for the pilot. According to one implementation, the flight director may include horizontal and vertical lines representing pitch and roll attitudes, respectively. Movement of the horizontal and vertical lines may indicate to the pilot that pitch or roll correction is needed in order to maintain or return to the pre-programmed flight path. Additionally or alternatively, the flight director may provide concentric circles on the aircraft display. The outer circle may represent measured or estimated aircraft performance parameters such as flight path angle or pitch and roll attitudes, while the inner circle shifts in any or all directions depending on the correction that the pilot should make to align the actual aircraft performance with the desired aircraft performance. By correcting appropriate flight parameters to maintain the inner circle within the outer circle, the pilot may be assured that the desired flight path is being followed.

The specific icons or representations utilized as flight director commands to guide the pilot through the flare maneuver are not germane to this disclosure. Rather, any type of flight director commands may be utilized within the scope of this disclosure so long as the flight director provides the pilot with guidance for flying the aircraft through a determined path in space from a calculated altitude for activating a flare mode and initiating a flare maneuver, to a touchdown location within a desired touchdown zone on the runway.

The flight director may be set in any number of modes corresponding to the current phase of flight. During each flight phase and corresponding flight director mode, the flight director may use varying input to provide appropriate output and guidance to the pilot. For example, as will be described in greater detail below with respect to the various embodiments, the flight director may function in an approach mode in which the flight director guides the pilot in flying the aircraft along a pre-flare flight path from a cruise altitude down to a pre-determined altitude above a runway. At the pre-determined altitude above the runway the flight director may switch to a flare mode for guiding the pilot through a flare maneuver that will ensure that the aircraft touches down at a low sink rate at a desired location on the runway.

In the following detailed description, references are made to the accompanying drawings that form a part hereof and that show, by way of illustration, specific embodiments, or examples. In referring to the drawings, like numerals represent like elements throughout the several figures. FIG. 1 is landing diagram 100 showing a side view of an aircraft 102 landing on a runway 104 according to the disclosure provided herein. This landing diagram 100 will be used to generally describe the landing process and corresponding flare maneuver. The flare guidance system that provides the pilot with guidance throughout this process, and specifically with respect to the flare maneuver, will be described in greater detail below.

As seen in FIG. 1, the pilot of the aircraft 102 is targeting a desired touchdown zone 106 on the runway 104 as the desired touchdown location 108 where the aircraft wheels first contact the surface of the runway 104. The precise size and location of the desired touchdown zone 106 may vary according to any number and type of factors. Example factors include, but are not limited to, the length of the runway 104; the weight, landing speed, and braking/thrust-reverse capabilities of the aircraft 102; environmental conditions such as altitude, temperature, and weather; pilot preference; and any combination thereof.

In order to land within the desired touchdown zone 106, a pilot flies the aircraft 102 along a pre-flare flight path 110 to the runway 104. The pilot may utilize a flight director to provide guidance for maintaining the proper ground speed, sink rate, altitude 114, and heading that will keep the aircraft 102 on the pre-flare flight path 110 to the runway 104. At a flare engage altitude 112, the flight director initiates the flare maneuver and guides the pilot through the flare until landing at the desired touchdown location 108. As seen in the landing diagram 100, the aircraft flare trajectory 116 is curvilinear, essentially leveling out the substantially downward trajectory of the pre-flare flight path 110 to provide a gentle touchdown on the runway 104.

Figure 2:
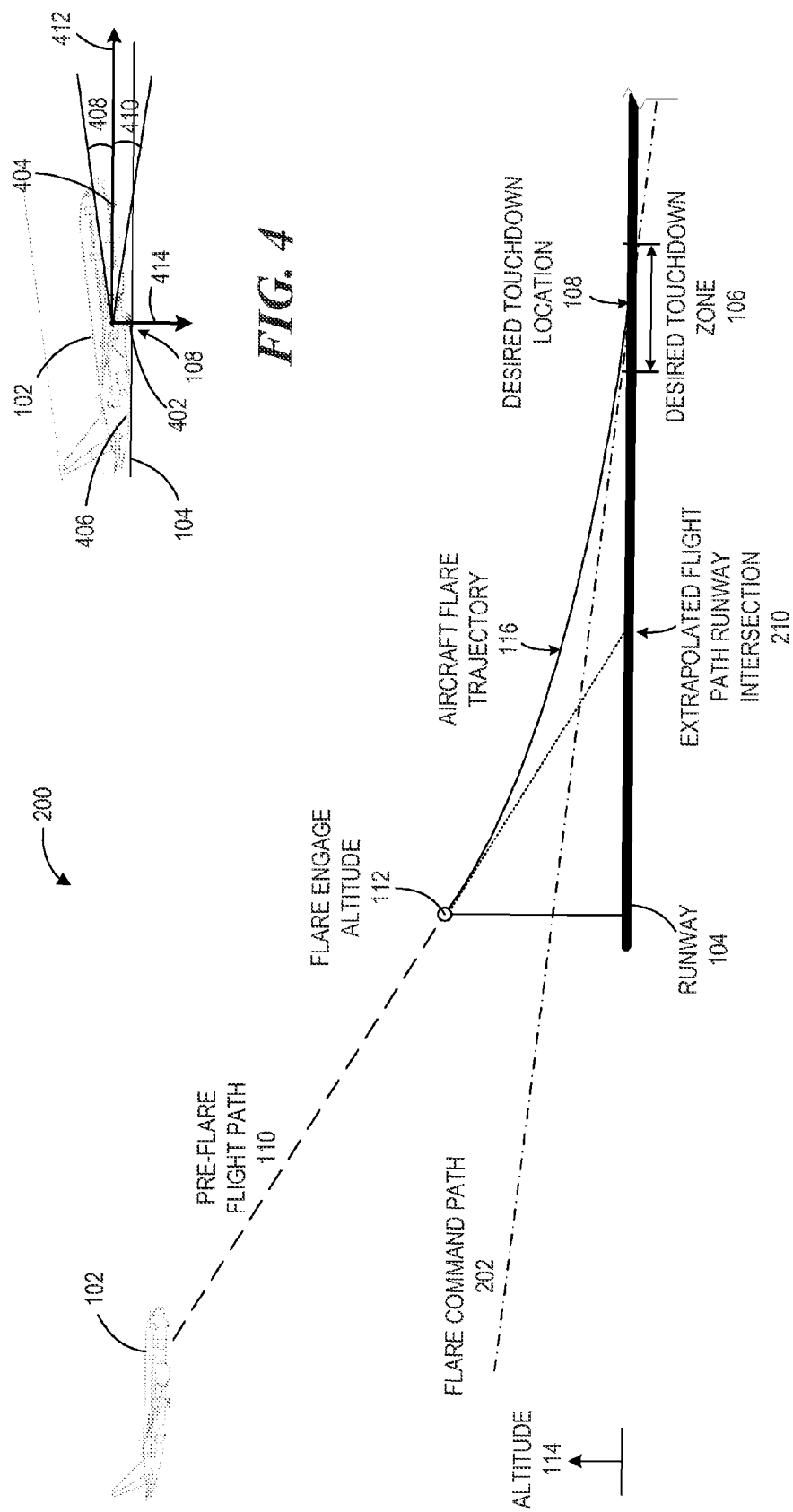
FIG. 2 is an expanded landing diagram illustrating additional aspects to the landing diagram of FIG. 1 used to determine the aircraft flare trajectory from the flare engage altitude to the desired touchdown location, in accordance with embodiments presented herein.

Turning to FIG. 2, an expanded landing diagram 200 shows the same pre-flare flight path 110, flare engage altitude 112, aircraft flare trajectory 116, and desired touchdown location 108 as described above with respect to FIG. 1. However, the expanded landing diagram 200 of FIG. 2 additionally illustrates some calculated paths through space that will be utilized by the flare guidance system in order to provide flight director commands that will result in the aircraft 102 maneuvering to the desired touchdown location 108 via the aircraft flare trajectory 116 as shown.

Specifically, the expanded landing diagram 200 shows a flare command path 202. As will become clear in the discussion below with respect to the various components and processes of the flare guidance system, the flare command path 202 is a linear path through space that is defined as an altitude 114 above the runway 104 versus the longitudinal distance of the runway. Using the extrapolated flight path runway intersection 210, and the location of the desired touchdown zone 106 with respect to that intersection, the flare command path 202 is constructed to intersect the runway 104 within the desired touchdown zone 106 for the given approach. The slope of the flare command path 202 is calculated to provide a desired sink rate at touchdown, given the ground speed of the aircraft 102 at the engagement of the flare mode, which occurs at the flare engage altitude 112.

In general, the flare guidance system described herein will determine the flare command path 202, determine the flare engage altitude 112, and will guide the pilot smoothly through the flare maneuver to direct the aircraft 102 from the flare engage altitude 112 to the flare command path 202 along the aircraft flare trajectory 116. The aircraft flare trajectory 116 is a commanded path through space through which the aircraft 102 will transition from the higher sink rate, or altitude rate, associated with the pre-flare flight path 110 at the flare engage altitude 112 to the lower sink rate appropriate for touchdown at the desired touchdown location 108 within the desired touchdown zone 106. While conventional flare guidance systems provide some guidance to the pilot for performing a flare maneuver, these conventional systems do not define a path in space for the aircraft 102, and provide corresponding guidance to maintain flight in that defined path through space, from the flare engagement to touchdown. By providing this commanded path in space, the concepts and technologies described herein provide for controlled landing distances with accurate touchdowns within the desired touchdown zone 106.

According to various embodiments, the intersection of the flare command path 202 with the runway 104 will be some distance added to the extrapolated flight path runway intersection 210, if no flare maneuver took place. This strategy causes the flare command to be decoupled from any tracking errors from the approach mode. In contrast, conventional flare guidance systems do not include a distance error term in determining guidance commands. Because the flight director commands described herein are functions of both sink rate and distance downrange from the desired touchdown zone, the resulting flare maneuver is very consistent, regardless of which approach mode was being flown and how tightly the flight crew was tracking the approach guidance. This feature also allows flare guidance to be provided even if the flight directors were not engaged for the approach. According to one embodiment, the flare guidance flight director may pop up or otherwise become visible when the aircraft 102 is at or near flare engage altitude 112 for any approach being manually flown.

It should be appreciated that according to an alternative embodiment, the flare command path 202 may be defined utilizing the intersection of the approach path (not shown) with the ground, rather than the extrapolated flight path runway intersection 210. This embodiment may be desirable for performance landings, where the runway is very short and the desired touchdown zone 106 is to be tightly constrained. However, the resulting flare maneuver may vary depending on the precision with which the pilot was tracking the approach guidance before the flare mode engages.

As shown in the expanded landing diagram 200, the altitude 114 at the end of the flare command path 202 relative to the surface of the runway 104 may be negative after the runway intersection. This negative altitude indicates that the desired trajectory of the aircraft 102 after the desired touchdown location 108 is below the runway 104. In developing the final flare command for the flight director, the negative flare command path ensures that the flight director will continue to indicate that the aircraft 102 is to descend to complete the landing maneuver if the pilot floats past the desired touchdown location 108. If the flare command path 202 were not allowed to go negative, the flare command could be satisfied and may command a longer than desired landing. With the flare command path 202 allowed to go negative, even if the pilot floats past the desired touchdown location 108, the flare command will be ensured to ask for a descent, thus helping to minimize the negative effects of going past the desired touchdown location 108.

Figure 3:
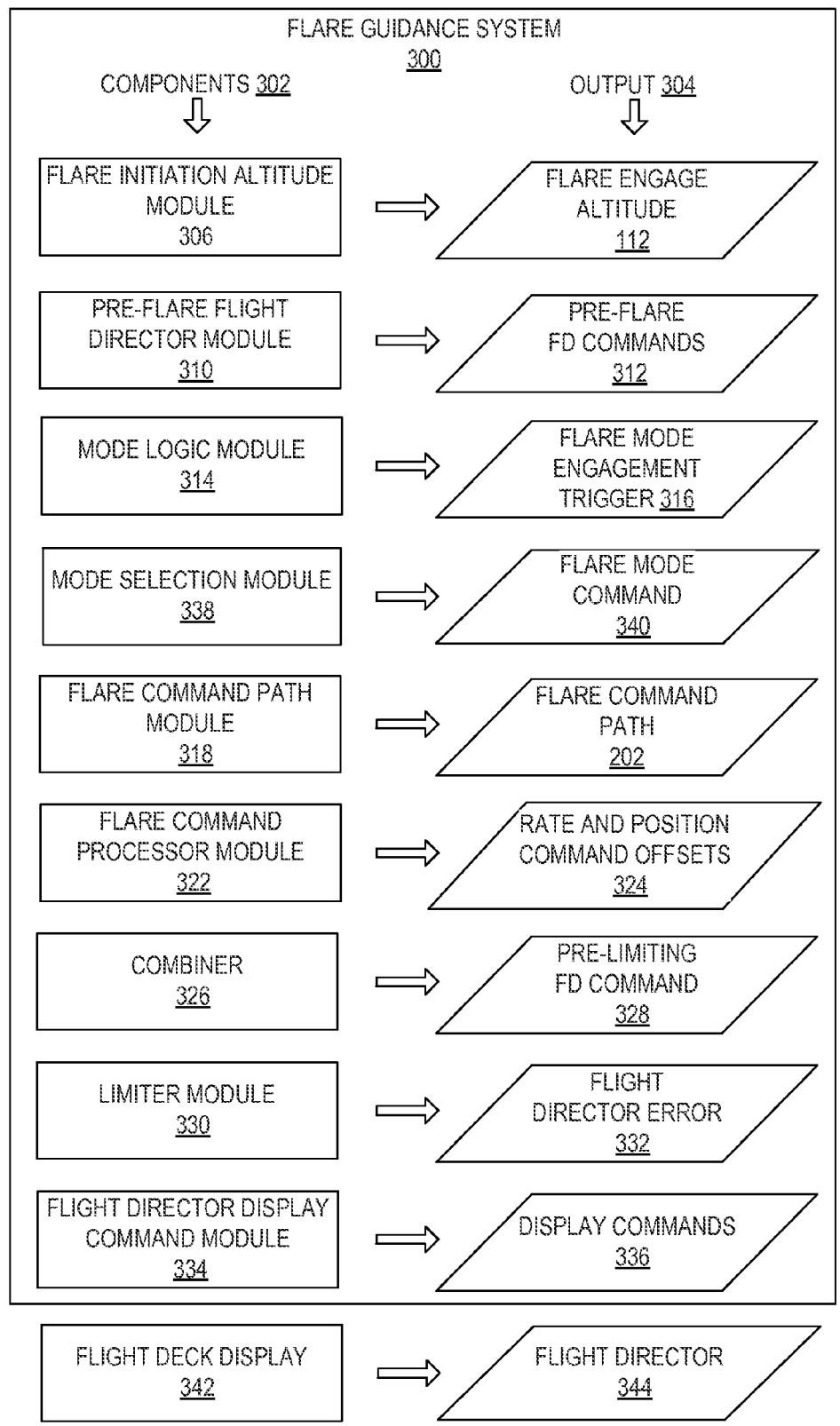
FIG. 3 is a block diagram illustrating various components and corresponding outputs of a flare guidance system, in accordance with embodiments presented herein.

FIG. 3 is a block diagram showing a number of components 302 of a flare guidance system 300, along with the output 304 of each of the components 302, according to the disclosure herein. It should be understood that FIG. 3 is a generalized representation of components 302 of the flare guidance system 300, along with outputs 304 associated with the components 302. The components 302 will be described as "modules," which for the purpose of this disclosure may include hardware, software, or a combination thereof. The disclosure herein is not limited to these particular types or quantity of components 302. The components 302 shown in FIG. 3 may not be independent of one another as shown, but rather may be combined, or further divided, to provide the relevant outputs 304. For example, the flare guidance system 300 may include a single computer processor and computer-readable instructions, that when executed by the processor, utilize various input to provide the all or a portion of the output 304 shown in FIG. 3 and described herein. By describing the flare guidance system 300 in terms of the various modules shown in FIG. 3, the determinations made by the flare guidance system 300 for providing flight director commands for guiding a pilot through the flare maneuver may be better understood. As is described below with respect to FIG. 5, the outputs 304 from some components 302 may be used in various combinations as inputs to other components 302. The relationships between the various components 302 and corresponding outputs 304 will be described in detail with respect to FIG. 5 below.

Looking at FIG. 3, the flare guidance system 300 may include a flare initiation altitude module 306. According to various embodiments, the flare initiation altitude module 306 determines the flare engage altitude 112, which is the altitude 114 at which the flare mode will engage. As discussed herein, the flare mode represents the mode of the flare guidance system 300 that provides error correction and flight guidance to the pilot in order to fly the aircraft 102 along the aircraft flare trajectory 116 to the desired touchdown zone 106. The flare mode may follow an approach guidance mode used by the pilot to fly the aircraft 102 from a cruise or other flight phase to the runway 104 for landing. The flare engage altitude 112 may vary according to a number of factors. These factors may include, but are not limited to, flap setting, airspeed, descent rate, ambient temperature, field elevation, desired touchdown zone 106, runway length, runway slope, or any other characteristics that may affect the flare profile.

A pre-flare flight director module 310 may determine pre-flare flight director commands 312 that drive one or more pre-flare symbols on a display for the pilot prior to activation of the flare mode. According to various embodiments, these pre-flare symbols may move at a rate that corresponds with the pitch rate that will be called for at flare initiation. The pitch rate commanded by the flight director at flare initiation may be a function of a number of factors, including but not limited to, flap setting, airspeed, descent rate, runway slope, or other characteristics that may affect the flare profile. By providing an indication of the pitch rate for the flare maneuver prior to the activation of the flare mode, the pilot's ability to track the flare mode flight director command may be enhanced. The pre-flare flight director module 310 may provide the pre-flare flight director commands 312 at a pre-determined altitude above the flare engage altitude 112 that may depend on flight parameters of the aircraft 102, such as the ground speed, descent rate, or others. Alternatively or additionally, the pre-determined altitude for providing the pre-flare flight director commands 312 may be preset according to company or pilot preferences.

Another component 302 of the flare guidance system 300 may include a mode logic module 314 that controls the flight director modes of operation. The mode logic module 314 may monitor flight parameters such as the radio altitude of the aircraft 102 and compare it to the flare engage altitude 112. According to one embodiment, the radio altitude may be corrected for aircraft body attitudes or radio altitude antenna placement, or may be subjected to inertial smoothing, prior to the comparison to the flare engage altitude 112. When the resulting processed radio altitude is equal to or less than the calculated flare initiation altitude, the mode logic module 314 provides a flare mode engagement trigger 316 that initiates the activation of the flare mode. The flare mode engagement trigger 316 may include data or signals that trigger other components 302 of the flare guidance system 300 to perform additional operations. One example includes triggering a mode selection module 338 to provide a flare mode command 340 that transitions a flight deck display 342 from displaying the approach mode flight director to displaying the flight director 344 corresponding to the flare mode.

Additionally, upon receipt of the flare mode engagement trigger 316, a flare command path module 318 determines a flare command path 202. As described above, the flare command path 202 is a linear path in space having a slope corresponding to a desired descent rate at the desired touchdown location 108, while intersecting the runway 104 within the desired touchdown zone 106. Various parameters are used in the calculation of the flare command path 202, including but not limited to the ground speed of the aircraft 102 at the flare engage altitude 112, the descent rate of the aircraft 102 at the flare engage altitude 112, the length of the runway, and the distance of the desired touchdown zone 106 from the extrapolated flight path runway intersection 210.

As an example, the ground speed and descent rate of the aircraft 102 may be used to determine the location of the extrapolated flight path runway intersection 210. An additional distance is added to the location of the extrapolated flight path runway intersection 210 to determine the desired touchdown location 108. This additional distance may be a constant, or may be a factor of other variables depending on the desired implementation. For instance, if the runway distance is short and a performance landing is desired, then the distance added to the extrapolated flight path runway intersection 210 to determine the desired touchdown location 108 may be reduced.

According to the embodiments described herein, a flare command processor module 322 is initialized upon activation of the flare mode. According to one embodiment, the flare command processor module 322 includes a second order filter or higher with both rate and position command offsets 324 as output 304. The flare command processor module 322 provides flight director commands that provide a smooth transition from the position of the aircraft 102 at the flare engage altitude 112 to the flare command path 202. This transition is illustrated and described above as the aircraft flare trajectory 116. When initialized, the flare command processor module 322 creates rate and position command offsets 324 that match the altitude and descent rate of the aircraft 102 at the flare mode engagement. The rate and position command offsets 324 decrease over time at a rate that creates the aircraft flare trajectory 116. The rate and position command offset 324 may be viewed as the difference between the flare command path 202 and the aircraft flare trajectory 116. Stated another way, the aircraft flare trajectory 116 is created by adding the rate and position command offsets 324 to the flare command path 202.

The flare guidance system 300 further includes a combiner 326. The combiner 326 is operative to produce a pre-limiting flight director command 328. As will be described in greater detail below with respect to FIG. 6, the combiner 326 produces altitude and altitude rate error signals, which are combined to form a command in the form of a pitch attitude or a flight path vector. The sum of this command with the corresponding current aircraft parameter creates an error that may be subject to a limiting function by the limiter module 330. The limiter module 330, as will be described in further detail below, provides a flight director error 332, which after possible additional processing such as filtering or gain scheduling, may be supplied to the flight deck display 342 by a flight director command module 334 as display commands 336. The flight deck display 342 converts the display commands 336 into the flight director 344 for guiding the pilot through the flare maneuver.

As previously discussed, pilots typically attempt to touch down on the runway 104 at a very low sink rate in order to provide a soft, comfortable landing for the passengers. FIG. 4 illustrates a position of the aircraft 102 at the desired touchdown location 108 upon initial contact with the runway 104. During a typical flare maneuver during landing, the pilot pitches the aircraft 102 up so that the aircraft 102 sinks to the runway 104 at a reduced sink rate that settles the main landing gear 402 onto the runway 104 first, followed by the nose gear 404 as the aircraft 102 slows. However, if the aircraft 102 is pitched too high at or near touchdown, the tail 406 of the aircraft 102 may strike the runway 104, which may cause damage and potential loss of control of the aircraft 102. Similarly, if the pitch of the aircraft 102 is too low, the nose gear 404 may contact the runway 104 prior to the main landing gear, which may damage the nose gear assembly. Conventional flare guidance systems do not account for and provide guidance that avoids tail strike and nose gear first landings.

According to various embodiments, the limiter module 330 may prevent tail strike and nose wheel landings by applying command limits to the flight director commands prior to providing the guidance to the pilot. For example, the limiter module 330 may determine the pitch attitude range 408 that allows for a safe landing without striking the tail 406 or touching down with the nose gear 404 prior to the main landing gear 402. The pitch attitude range 408 may depend on specific characteristics of the aircraft 102, as well as of the runway 104. Alternatively, the pitch attitude range 408 may be determined by one or more components 302 other than the limiter module 330, or pre-programmed and accessed by the limiter module 330. The limiter module 330 then ensures that the flight director error 332 that is provided for guiding the pilot through the flare maneuver does not command the pilot to pitch the aircraft 102 to an angle that is outside of the pitch attitude range 408. It should be noted that the pitch attitude range 408 is measured from a local level vector 412, which is normal to the gravity vector 414.

The limiter module 330 may also limit the flight path angle 410 to ensure that the flight director error 332 used for guiding the pilot through the flare maneuver does not call for a positive climb rate relative to the ground during flare. The flight path angle 410 is shown in FIG. 4 as being negative as measured from the local level vector 412. The flight path angle 410 being negative indicates that the aircraft 102 is descending. According to various embodiments, the limiter module 330 will not provide a flight director error 332 that would result in a request for a flight path angle 410 that is positive, or asking the pilot to climb. Pilots may be reluctant to follow a command that calls for a climb during the flare maneuver. There may be situations, such as when approaching an upsloping runway, in which a flight path angle 410 that is positive may traditionally be requested in order to achieve the desired sink rate. However, according to at least one embodiment, the limiter module 330 will limit the flight director error 332 to prevent a flight path angle 410 that is positive and allow a slightly harder touchdown.

Figure 5:
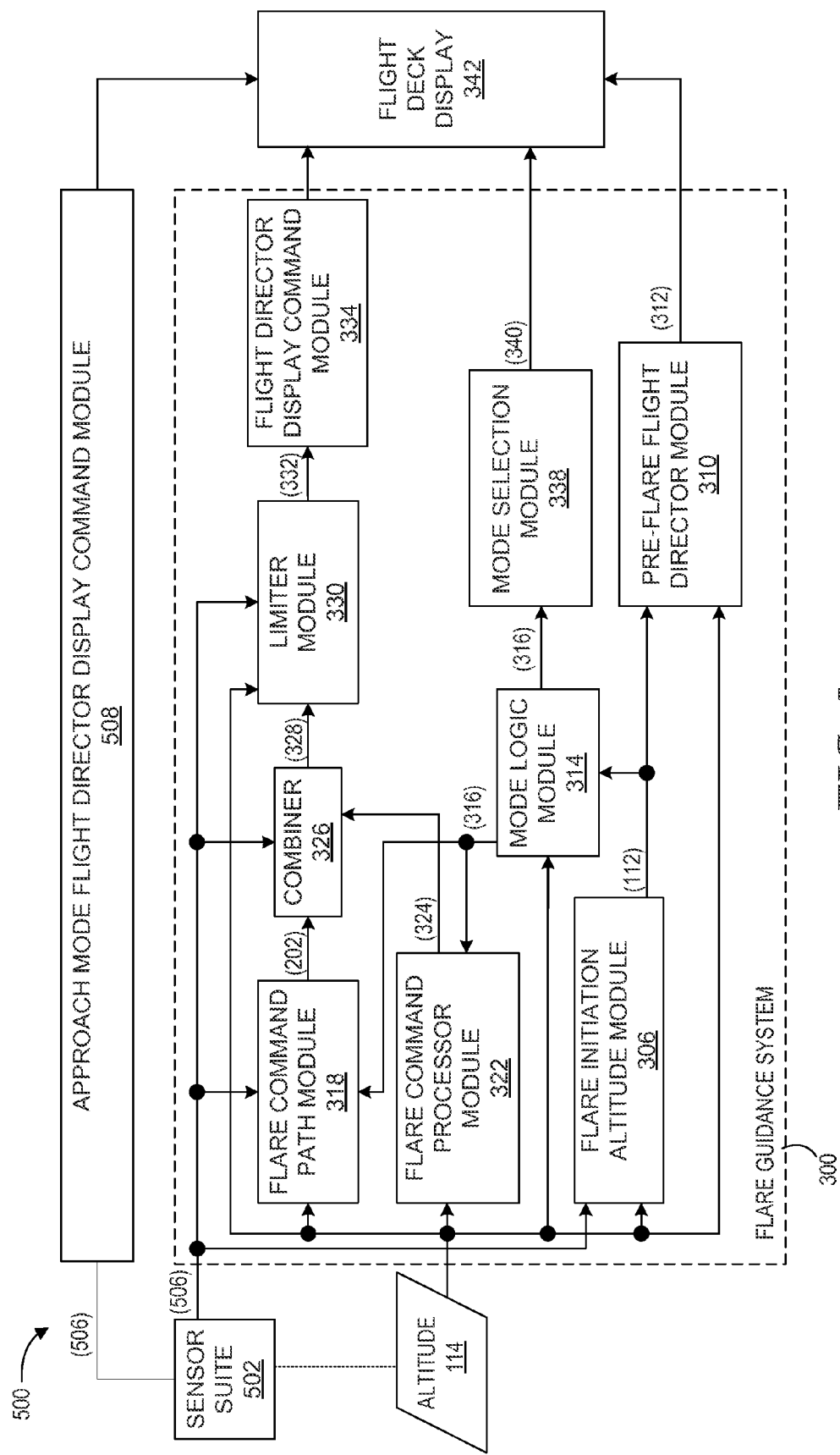
FIG. 5 is a block diagram illustrating the flow of data through a flare guidance system, in accordance with embodiments presented herein.

Turning now to FIG. 5, a block diagram 500 of the flare guidance system 300 will be shown and described to illustrate the relationship between various components 302 and flow of the outputs 304 from the components 302 throughout the system. As input to the flare guidance system 300, a sensor suite 502 may provide any type of current flight, environmental, or aircraft data as sensor suite output 506 to the flare guidance system 300. The sensor suite 502 may include any type and quantity of aircraft and environmental sensors installed on or within the aircraft 102. Example sensor suite output 506 may include, but is not limited to, altitude 114, temperature, pressure, airspeed, pitch attitude, pitch rate, roll attitude, roll rate, yaw rate, descent rate, ground speed, and any other relevant data. Prior to engagement of the flare guidance system 300, the pilot may follow flight director guidance to track a localizer or glideslope while flying an approach to a runway 104. In doing so, an approach mode flight director display command module 508 receives flight, aircraft, and environmental input from the sensor suite 502 and determines the appropriate errors for directing the pilot through the approach. According to embodiments described herein, at the flare engage altitude 112, the flight deck display 342 transitions from the approach mode to a flare mode in which the flare guidance system 300 guides the pilot through the flare maneuver in order to maintain the aircraft 102 along the aircraft flare trajectory 116 and perform a smooth touchdown in the desired touchdown zone 106.

As discussed above, the flare guidance system 300 includes a flare initiation altitude module 306 that determines the flare engage altitude 112 at which the flare mode will engage. The flare engage altitude 112 may vary according to a number of factors. These factors may include, but are not limited to, various data from the sensor suite 502 such as flap setting, airspeed, descent rate, ambient temperature, field elevation, altitude 114, or any other characteristics that may affect the flare profile. The flare initiation altitude module 306 provides the flare engage altitude 112 to the mode logic module 314 and the pre-flare flight director module 310.

According to one embodiment, the pre-flare flight director module 310 may provide pre-flare flight director commands 312 to the flight deck display 342 for displaying one or more pre-flare symbols that move at a rate corresponding to the pitch rate that will be called for at flare initiation. These pre-flare symbols may be displayed on the flight deck display 342 while the flight deck display 342 is configured in an approach mode, prior to switching to the flare mode. It should be appreciated that the pitch rate associated with the motion of the pre-flare symbols may depend upon the altitude 114, aircraft ground speed, and descent rate with respect to the position of the aircraft 102 with respect to the desired touchdown zone 106, or alternatively be based on these factors as well as the determined aircraft flare trajectory 116 such that input from the combiner 326 may be used (not represented in FIG. 5). The pre-flare flight director module 310 may provide the pre-flare flight director commands 312 at a pre-determined altitude above the flare engage altitude 112 that may depend on flight parameters of the aircraft 102, such as the ground speed, descent rate, or others. Alternatively or additionally, the pre-determined altitude for providing the pre-flare flight director commands 312 may be preset according to company or pilot preferences.

The flare initiation altitude module 306 additionally provides the flare engage altitude 112 to the mode logic module 314. The mode logic module 314 controls the flight director modes of operation. According to one embodiment, the mode logic module 314 monitors flight parameters from the sensor suite 502, such as the altitude 114, to determine when to switch the flight director to the flare mode for guiding the pilot through the flare maneuver. The mode logic module 314 may monitor and compare the altitude 114 of the aircraft 102 to the flare engage altitude 112. As previously stated, the altitude 114 may be corrected for aircraft body attitudes or radio altitude antenna placement, or may be subjected to inertial smoothing, prior to the comparison to the flare engage altitude 112.

When the resulting processed radio altitude is equal to or less than the calculated flare engage altitude 112, the mode logic module 314 provides a flare mode engagement trigger 316 that initiates the activation of the flare mode. The flare mode engagement trigger 316 is received at the mode selection module 338, which provides the flare mode command 340 that transitions the flight deck display 342 from displaying the approach mode flight director to displaying the flare mode flight director 344. The flare mode engagement trigger 316 is also sent to the flare command path module 318 and the flare command processor module 322. The flare command path module 318 determines a flare command path 202 utilizing various parameters, including but not limited to the ground speed of the aircraft 102 at the flare engage altitude 112, the descent rate of the aircraft 102 at the flare engage altitude 112, the length of the runway, and the distance of the desired touchdown zone 106 from the extrapolated flight path runway intersection 210.

The flare command processor module 322 is initialized upon receipt of the flare mode engagement trigger 316. As previously discussed, the flare command processor module 322 may include a second order filter with rate and position command offset 324 as output 304. The rate and position command offset 324 are combined with data corresponding to the flare command path 202 at the combiner 326 to produce altitude and altitude rate error signals, which are combined to form a pre-limiting flight director command 328 in the form of a pitch attitude or a flight path vector. The pre-limiting flight director command 328 may be considered an error that indicates how close the aircraft 102 is to the defined path in space, or desired aircraft flare trajectory 116. The pilot provides the necessary flight input to correct this error to maintain flight on or return to the aircraft flare trajectory 116 during the flare maneuver. The combiner 326 is described in further detail below with respect to FIG. 6.

The pre-limiting flight director command 328 from the combiner 326 is subject to theta and gamma limiting functions within the limiter module 330 to produce a flight director error 332. As discussed above, the flight director error 332 overrides the pre-limiting flight director command 328 if the pre-limiting flight director command 328 results in flight director guidance that will lead to a nose-wheel or tail strike during landing, or would lead to instructions to the pilot to climb. The flight director error 332, may be subject to additional processing such as filtering or gain scheduling before being provided to the flight deck display 342 by a flight director command module 334 in the form of display commands 336. The flight deck display 342 then converts the display commands 336 into the flight director 344 for guiding the pilot along the aircraft flare trajectory 116 during the flare maneuver.

Figure 6:
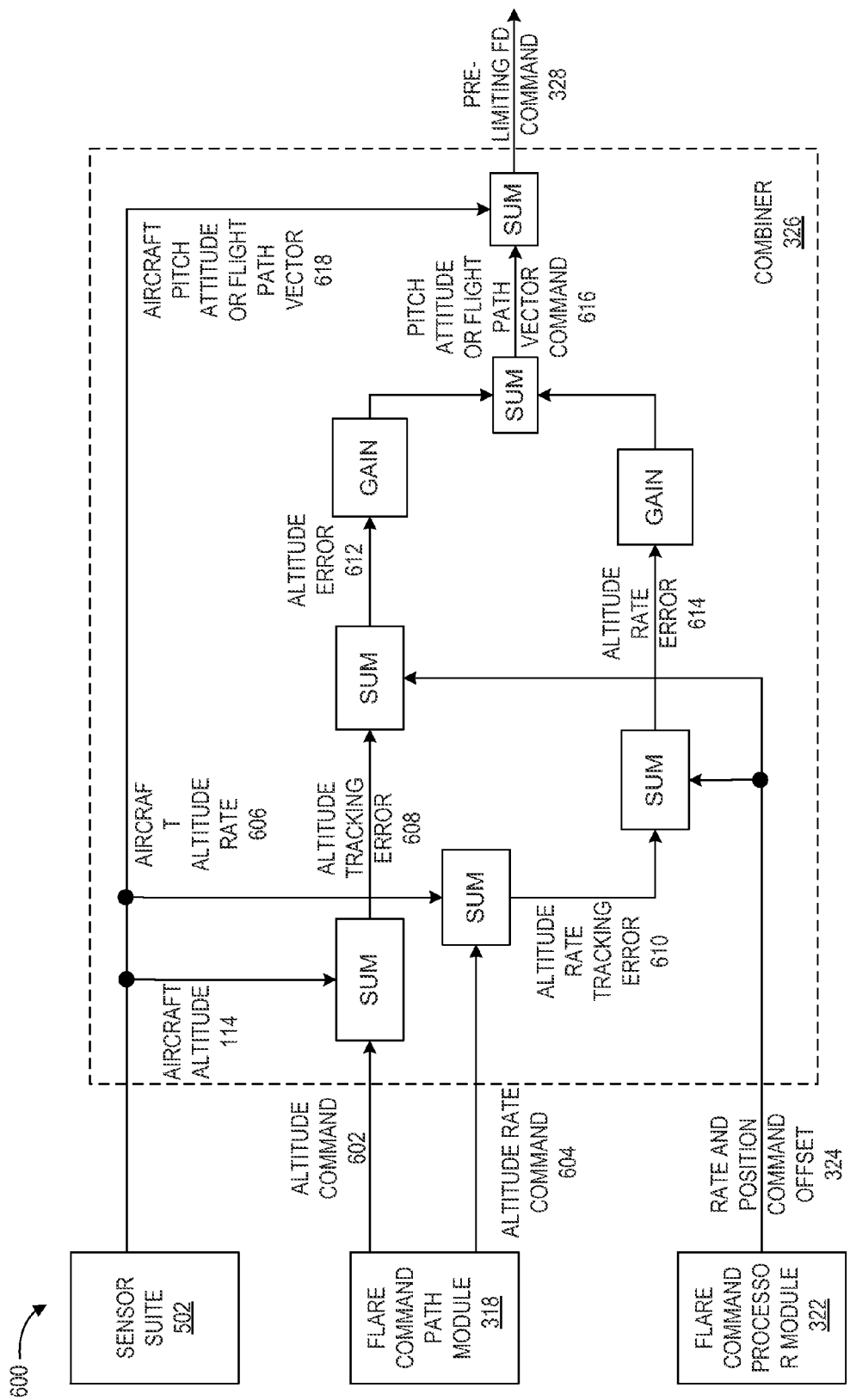
FIG. 6 is a block diagram illustrating the flow of data through a combiner, in accordance with embodiments presented herein.

Turning now to FIG. 6, the combiner 326 will be described in greater detail. FIG. 6 shows a block diagram 600 illustrating the flow and transformation of data from the sensor suite 502, the flare command path module 318, and the flare command processor module 322 through the combiner 326 to create the pre-limiting flight director command 328 that is used to create the flight director guidance through the flare maneuver. It should be appreciated that the block diagram 600 is a simplified illustration used to visually depict the various operations of the combiner 326 according to various embodiments. The embodiments described herein are not limited to the components, input or output data, or data flow paths shown in FIG. 6.

According to one embodiment, the sensor suite 502 supplies current aircraft flight parameters such as the aircraft altitude 114 and aircraft altitude rate 606, or descent rate, to the combiner 326. It should be appreciated that the terms "altitude rate," "descent rate," and "sink rate" may be used interchangeably to indicate the rate at which the aircraft 102 descends in altitude 114. The data output of the flare command path module 318 used to determine the flare command path 202 may include an altitude command 602 and an altitude rate command 604. The altitude command 602 and the altitude rate command 604 are summed with the aircraft altitude 114 and aircraft altitude rate 606, respectively, to arrive at the altitude tracking error 608 and the altitude rate tracking error 610. These errors are summed with the rate and position command offset 324 from the flare command processor module 322 to arrive at the altitude error 612 and altitude rate error 614.

Appropriate gains are applied to the altitude error 612 and the altitude rate error 614 and the error signals are combined to form a pitch attitude or flight path vector command 616. This command may then be summed with the corresponding current aircraft flight parameters such as aircraft pitch attitude or flight path vector 618 from the sensor suite 502 to create the pre-limiting flight director command 328. The pre-limiting flight director command 328 may then be subject to theta and gamma limiting before being provided to the flight deck display 342 for display as a flight director 344 for guiding the pilot through the flare maneuver as described above.

Figure 7:
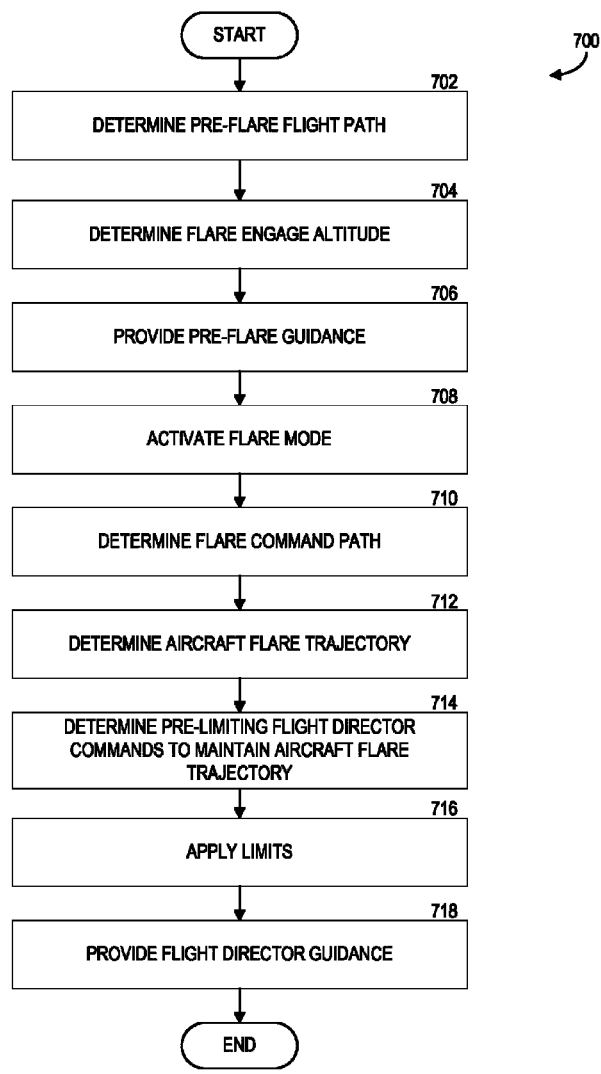
FIG. 7 is a flow diagram illustrating a method for providing flare maneuver guidance, in accordance with the embodiments presented herein.

Referring now to FIG. 7, additional details will be provided regarding embodiments presented herein for providing flare maneuver guidance. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 7 shows a routine 700 for providing flare maneuver guidance. In some embodiments, the routine 700 may be performed by the flare guidance system 300, including by one or all of the modules described above with respect to FIGS. 3-6. The routine 700 begins at operation 702, where the pre-flare flight path 110 is determined at the flare guidance system 300. The pre-flare flight path 110 may be determined by the approach mode flight director display command module 508 or associated system. At operation 704, the flare guidance system 300 determines the flare engage altitude 112 along the pre-flare flight path 110 at which the flare mode will be activated. This determination may be made by the flare initiation altitude module 306. From operation 704, the routine 700 continues to operation 706, where pre-flare guidance may be provided to the pilot. As previously described, according to one embodiment, the pre-flare flight director module 310 may provide pre-flare flight director commands 312 that result in one or more pre-flare symbols that move at a rate corresponding to the pitch rate that will be called for at flare initiation. These pre-flare symbols are displayed while the flight deck display 342 is configured in approach mode prior to flare mode engagement.

From operation 706, the routine 700 continues to operation 708, where the flare mode is activated upon determination by the mode logic module 314 that the aircraft 102 has reached the flare engage altitude 112. The mode selection module 338 provides the flare mode command 340 that transitions the flight deck display 342 from the approach mode to the flare mode. At operation 710, the flare command path module 318 calculates the flare command path 202 that will be used along with the rate and position command offsets 324 to guide the aircraft 102 smoothly from the flare engage altitude 112 to the desired touchdown zone 106.

The routine 700 continues from operation 710 to operation 712, where the flare guidance system 300 determines the aircraft flare trajectory 116. In determining the aircraft flare trajectory 116, the flare command processor module 322 provides rate and position command offsets 324 that is processed by the combiner 326 as described above with respect to FIG. 6 to arrive at a pitch attitude or flight path vector command 616 that will guide the pilot along the aircraft flare trajectory 116. At operation 714, the combiner 326 outputs the pre-limiting flight director commands 328 that provide the pilot with the current error correction based on current aircraft pitch attitude or flight path vector 618 that will allow the aircraft 102 to maintain flight along the aircraft flare trajectory 116. Included in determining the pre-limiting flight director commands 328 is receiving current aircraft flight parameters from the sensor suite 502 such as the aircraft pitch attitude or flight path vector 618.

The routine 700 continues from operation 714 to operation 716, where theta and gamma limits are applied to the pre-limiting flight director command 328 to create the flight director error 332. After any further processing by the flight director display command module 334, the flight director error 332 is provided at operation 718 to the flight deck display 342 for display as flight director guidance to the pilot during the flare maneuver, and the routine 700 ends.

Figure 8:
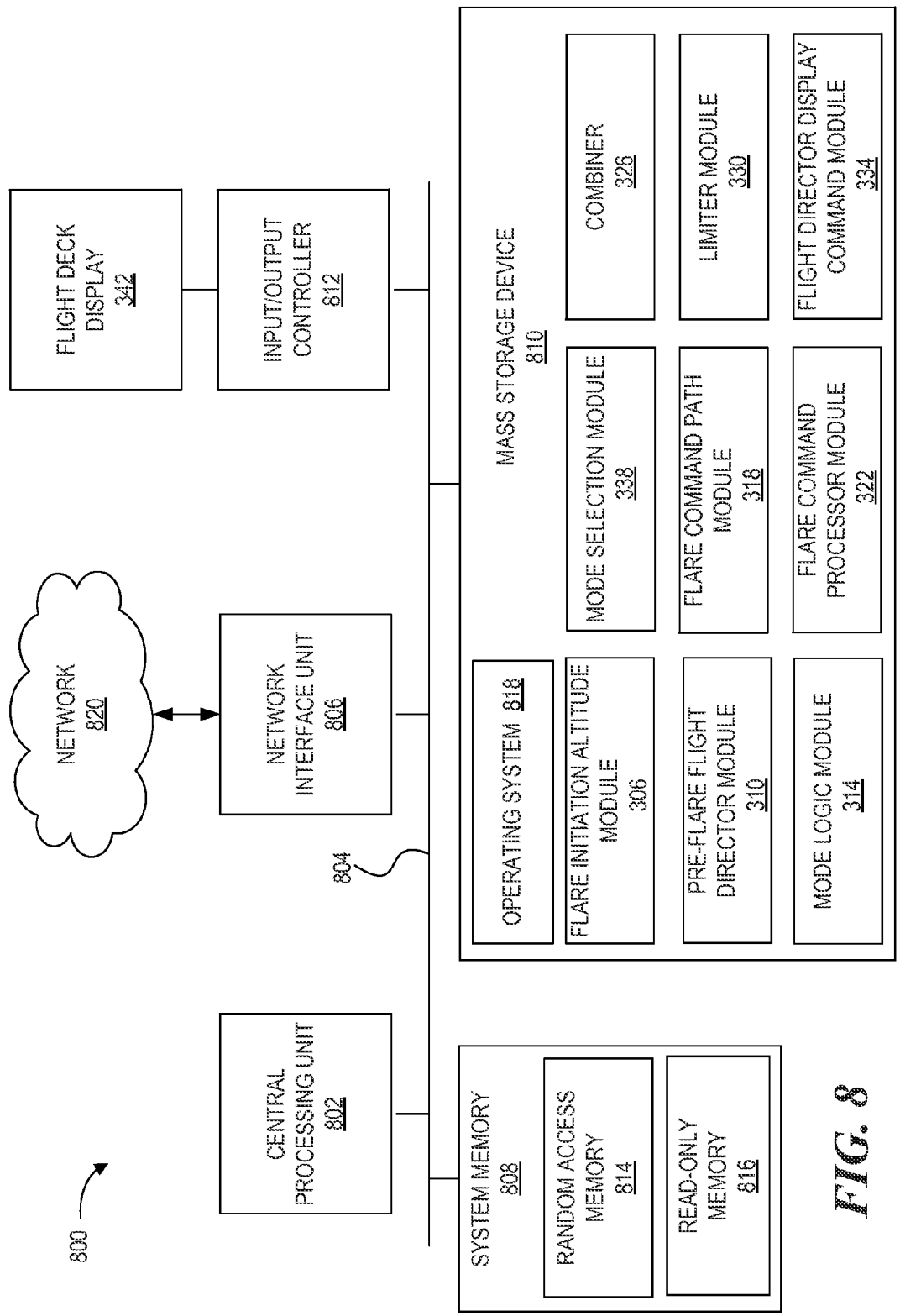
FIG. 8 is a block diagram showing an illustrative computer hardware and software architecture for a computing system capable of implementing aspects of the embodiments presented herein.

FIG. 8 shows an illustrative computer 800 capable of executing the software elements described herein for providing flight director guidance through a flare maneuver. The computer 800 may be embodied in single computing device or in a combination of one or more processing units, storage units, and/or other computing devices. The computer 800 includes one or more central processing units 802 ("CPUs"), a system memory 808, including a random access memory 814 ("RAM") and a read-only memory 816 ("ROM"), and a system bus 804 that couples the memory to the CPUs 802.

The CPUs 802 may be standard programmable processors that perform arithmetic and logical operations necessary for the operation of the computer 800. The CPUs 802 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 800 also includes a mass storage device 810. The mass storage device 810 may be connected to the CPUs 802 through a mass storage controller (not shown) further connected to the bus 804. The mass storage device 810 and its associated computer-readable media provide non-volatile, non-transitory storage for the computer 800. The mass storage device 810 may store an operating system 818, as well as specific application modules or other program modules, such as the flare initiation altitude module 306, the pre-flare flight director module 310, the mode logic module 314, the mode selection module 338, the flare command path module 318, the flare command processor module 322, the combiner 326, the limiter module 330, and the flight director display command module 334 described above in regard to FIG. 3. The mass storage device 810 may also store data collected or utilized by the various systems and modules, such as the outputs 304 associated with the components 302 of the flare guidance system 300 described above with respect to FIG. 3.

The computer 800 may store programs and data on the mass storage device 810 by transforming the physical state of the mass storage device to reflect the information being stored. The specific transformation of physical state may depend on various factors, in different implementations of this disclosure. Examples of such factors may include, but are not limited to, the technology used to implement the mass storage device 810, whether the mass storage device is characterized as primary or secondary storage, and the like. For example, the computer 800 may store information to the mass storage device 810 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete element in a solid-state storage device. Other transformations of physical media are possible without departing from the scope and spirit of the present description, with the foregoing examples provided only to facilitate this description. The computer 800 may further read information from the mass storage device 810 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer media that can be accessed by the computer 800. Computer-readable media includes communication media, such as signals, and computer-readable storage media. By way of example, and not limitation, computer-readable storage media includes volatile and non-volatile, removable and non-removable media implemented in any method or technology for the storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information in a non-transitory fashion and which can be accessed by the computer 800. According to one embodiment, the computer 800 may have access to computer-readable storage media storing computer-executable instructions that, when executed by the computer, perform the routine 700 for providing flare maneuver guidance, as described above in regard to FIG. 7.

According to various embodiments, the computer 800 may operate in a networked environment using logical connections to remote computers through a network, such as the network 820. The computer 800 may connect to the network 820 through a network interface unit 806 connected to the bus 804. It should be appreciated that the network interface unit 806 may also be utilized to connect to other types of networks and remote computer systems. The computer 800 may also include an input/output controller 812 for providing output to a display device, such as a flight deck display 342, computer monitor, a printer, or other type of output device. The input/output controller 812 may further receive input from devices, such as a keyboard, mouse, electronic stylus, touch screen, and the like. It will be further appreciated that the computer 800 may not include all of the elements shown in FIG. 8, may include other elements that are not explicitly shown in FIG. 8, or may utilize an architecture completely different than that shown in FIG. 8.

Based on the foregoing, it should be appreciated that technologies for providing flight director guidance to a pilot throughout a flare maneuver are provided herein. Although the subject matter presented herein has been described in language specific to computer structural features, methodological acts, and computer-readable media, it is to be understood that the disclosure defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A computer-implemented method for providing guidance during a flare maneuver of an aircraft, the method comprising:
   determining a pre-flare flight path to a runway;
   calculating a flare engage altitude along the pre-flare flight path;
   calculating a flare command path comprising a linear path intersecting the runway at a desired touchdown location and having a slope associated with a desired altitude rate at the desired touchdown location, the calculation comprising:
      an intersection of an extrapolated aircraft flight path and the runway,
      the desired touchdown location, and
      the desired altitude rate at touchdown;
   calculating an aircraft flare trajectory that transitions the aircraft from a location on the pre-flare flight path at the flare engage altitude to the flare command path at the touchdown location;
   receiving current aircraft flight parameters associated with a current aircraft flight path; and
   providing a flight director command that aligns the current aircraft flight path with the aircraft flare trajectory.

2. The method of claim 1, further comprising providing a pre-flare flight director command prior to activation of a flare mode that indicates a pitch rate associated with a flare maneuver.

3. The method of claim 2, wherein the pre-flare flight director command provides one or more pre-flare symbols on a flight deck display that move at a rate that corresponds with the pitch rate associated with the flare maneuver.

4. The method of claim 1, wherein the calculation of the flare command path further comprises a length associated with the runway.

5. The method of claim 1, wherein the aircraft flare trajectory comprises a substantially curvilinear flight path.

6. The method of claim 1, wherein the flare command path comprises a length that extends below the runway such that the flare command path represents a positive altitude prior to the desired touchdown location and a negative altitude beyond the desired touchdown location.

7. The method of claim 1, further comprising:
   determining whether a requested pitch attitude associated with the flight director command is outside of a determined pitch attitude range; and
   if the pitch attitude is outside of the determined pitch attitude range, adjusting the flight director command such that the requested pitch attitude is within the determined pitch attitude range.

8. The method of claim 1, further comprising:
   determining whether a requested flight path angle associated with the flight director command requests a positive climb rate for the aircraft; and
   if the requested flight path angle does request the positive climb rate, adjusting the flight director command such that the requested flight path angle does not request the positive climb rate.

9. The method of claim 1, wherein providing the flight director command that aligns the current aircraft flight path with the aircraft flare trajectory comprises:
   receiving a rate command offset and a position command offset;
   receiving an altitude command and an altitude rate command associated with the flare command path;

receiving a current aircraft altitude and a current aircraft altitude rate;

summing the current aircraft altitude and the altitude command to arrive at an altitude tracking error;

summing the current aircraft altitude rate and the altitude rate command to arrive at a altitude rate tracking error;

summing the altitude tracking error and the position command offset to arrive at an altitude error;

summing the altitude rate tracking error with the rate command offset to arrive at an altitude rate error;

combining the altitude error and the altitude rate error to arrive at a pitch attitude or flight path vector command; and summing the pitch attitude or flight path vector command with a current aircraft pitch attitude or flight path vector to arrive at the flight director command representing a change in aircraft trajectory to align the current aircraft flight path with the aircraft flare trajectory.

10. A computer-readable storage medium comprising computer-executable instructions that, when executed by a computer, cause the computer to:

determine a pre-flare flight path for an aircraft to a runway;

calculate a flare engage altitude along the pre-flare flight path;

calculate a flare command path comprising a linear path intersecting the runway at a desired touchdown location and having a slope associated with a desired altitude rate at the desired touchdown location, the calculation comprising:

an intersection of an extrapolated aircraft flight path and the runway, the desired touchdown location, and the desired altitude rate at touchdown;

calculate an aircraft flare trajectory that transitions the aircraft from a location on the pre-flare flight path at the flare engage altitude to the flare command path at the touchdown location;

receive current aircraft flight parameters associated with a current aircraft flight path; and provide a flight director command that aligns the current aircraft flight path with the aircraft flare trajectory.

11. The computer-readable storage medium of claim 10, wherein the calculation of the flare command path further comprises a length associated with the runway.

12. The computer-readable storage medium of claim 10, wherein the flare command path comprises a length that extends below the runway such that the flare command path represents a positive altitude prior to the desired touchdown location and a negative altitude beyond the desired touchdown location.

13. The computer-readable storage medium of claim 10, comprising further computer-executable instructions that, when executed by the computer, cause the computer to:

determine whether a requested pitch attitude associated with the flight director command is outside of a determined pitch attitude range; and if the pitch attitude is outside of the determined pitch attitude range, adjust the flight director command such that the requested pitch attitude is within the determined pitch attitude range.

14. The computer-readable storage medium of claim 10, comprising further computer-executable instructions that, when executed by the computer, cause the computer to:

determine whether a requested flight path angle associated with the flight director command requests a positive climb rate for the aircraft; and if the requested flight path angle does request the positive climb rate, adjust the flight director command such that the requested flight path angle does not request the positive climb rate.

15. The computer-readable storage medium of claim 10, wherein causing the computer to provide the flight director command that aligns the current aircraft flight path with the aircraft flare trajectory comprises causing the computer to:

receive a rate command offset and a position command offset;

receive an altitude command and an altitude rate command associated with the flare command path;

receive a current aircraft altitude and a current aircraft altitude rate;

sum the current aircraft altitude and the altitude command to arrive at an altitude tracking error;

sum the current aircraft altitude rate and the altitude rate command to arrive at an altitude rate tracking error;

sum the altitude tracking error and the position command offset to arrive at an altitude error;

sum the altitude rate tracking error with the rate command offset to arrive at an altitude rate error;

combine the altitude error and the altitude rate error to arrive at a pitch attitude or flight path vector command; and sum the pitch attitude or flight path vector command with a current aircraft pitch attitude or flight path vector to arrive at the flight director command representing a change in aircraft trajectory to align the current aircraft flight path with the aircraft flare trajectory.

16. A system for providing guidance during a flare maneuver of an aircraft, the system comprising:

a processor;

a memory communicatively coupled to the processor; and a program module which executes in the processor from the memory and which, when executed by the processor, causes the processor to:

determine a pre-flare flight path for the aircraft to a runway;

calculate a flare engage altitude along the pre-flare flight path;

calculate a flare command path comprising a linear path intersecting the runway at a desired touchdown location and having a slope associated with a desired altitude rate at the desired touchdown location, the calculation comprising:

an intersection of an extrapolated aircraft flight path and the runway, the desired touchdown location, and the desired altitude rate at touchdown;

calculate an aircraft flare trajectory that transitions the aircraft from a location on the pre-flare flight path at the flare engage altitude to the flare command path at the touchdown location;

receive current aircraft flight parameters associated with a current aircraft flight path; and provide a flight director command that aligns the current aircraft flight path with the aircraft flare trajectory.

17. The system of claim 16, wherein the calculation of the flare command path further comprises a length associated with the runway.

18. The system of claim 16, wherein the program module which executes in the processor from the memory and which, when executed by the processor, further causes the processor to:

determine whether a requested pitch attitude associated with the flight director command is outside of a determined pitch attitude range; and if the pitch attitude is outside of the determined pitch attitude range, adjust the flight director command such that the requested pitch attitude is within the determined pitch attitude range.

19. The system of claim 16, wherein the program module which executes in the processor from the memory and which, when executed by the processor, further causes the processor to:

determine whether a requested flight path angle associated with the flight director command requests a positive climb rate for the aircraft; and if the requested flight path angle does request the positive climb rate, adjust the flight director command such that the requested flight path angle does not request the positive climb rate.

20. The system of claim 16, wherein the program module causing the processor to provide the flight director command that aligns the current aircraft flight path with the aircraft flare trajectory comprises causing the processor to:

receive a rate command offset and a position command offset;

receive an altitude command and an altitude rate command associated with the flare command path;

receive a current aircraft altitude and a current aircraft altitude rate;

sum the current aircraft altitude and the altitude command to arrive at an altitude tracking error;

sum the current aircraft altitude rate and the altitude rate command to arrive at an altitude rate tracking error;

sum the altitude tracking error and the position command offset to arrive at an altitude error;

sum the altitude rate tracking error with the rate command offset to arrive at an altitude rate error;

combine the altitude error and the altitude rate error to arrive at a pitch attitude or flight path vector command; and sum the pitch attitude or flight path vector command with a current aircraft pitch attitude or flight path vector to arrive at the flight director command representing a change in aircraft trajectory to align the current aircraft flight path with the aircraft flare trajectory.

* * * * *